(12) United States Patent
Siegel

(10) Patent No.: US 10,748,460 B1
(45) Date of Patent: Aug. 18, 2020

(54) TANGIBLE DISPLAY

(71) Applicant: Amazon Technologies, Inc., Seattle, WA (US)

(72) Inventor: Hilliard Bruce Siegel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/365,423

(22) Filed: Mar. 26, 2019

(51) Int. Cl.
| | |
|---|---|
| *G09F 19/02* | (2006.01) |
| *G06F 3/01* | (2006.01) |
| *G09G 3/00* | (2006.01) |
| *G09F 13/20* | (2006.01) |
| *A61B 34/32* | (2016.01) |
| *G09G 3/20* | (2006.01) |
| *G01L 1/26* | (2006.01) |
| *H04N 9/31* | (2006.01) |
| *H04L 29/08* | (2006.01) |
| *G09F 19/22* | (2006.01) |

(52) U.S. Cl.
CPC .............. *G09F 19/02* (2013.01); *G06F 3/016* (2013.01); *G09F 13/20* (2013.01); *G09G 3/003* (2013.01); *G01L 1/26* (2013.01); *G09F 19/22* (2013.01); *H04L 67/10* (2013.01); *H04N 9/31* (2013.01)

(58) Field of Classification Search
CPC .......... G09F 19/02; G09F 13/20; G06F 3/016; G09G 3/003; G01L 1/26; H04L 67/10; H04N 9/31; A61B 34/32
See application file for complete search history.

(56) References Cited

U.S. PATENT DOCUMENTS

| | | | | |
|---|---|---|---|---|
| 2011/0273466 | A1* | 11/2011 | Imai | G09G 3/20 345/589 |
| 2014/0022162 | A1* | 1/2014 | Yu | G06F 3/016 345/156 |
| 2017/0181808 | A1* | 6/2017 | Panescu | A61B 34/32 |

* cited by examiner

*Primary Examiner* — Lin Li
(74) *Attorney, Agent, or Firm* — Athorus, PLLC

(57) ABSTRACT

Described are systems, methods, and apparatus that produce depth data representative of an object, such as a user, at a first location, transmit that depth data to a second location, and use that depth data to produce, at the second location, a three-dimensional representation of the object. A tangible display at the second location may receive the depth data and use that depth data to determine displacement amounts for each of a plurality of moveable pins of the tangible display. The moveable pins may be then displaced by the displacement amounts to form the three-dimensional representation of the object.

20 Claims, 9 Drawing Sheets

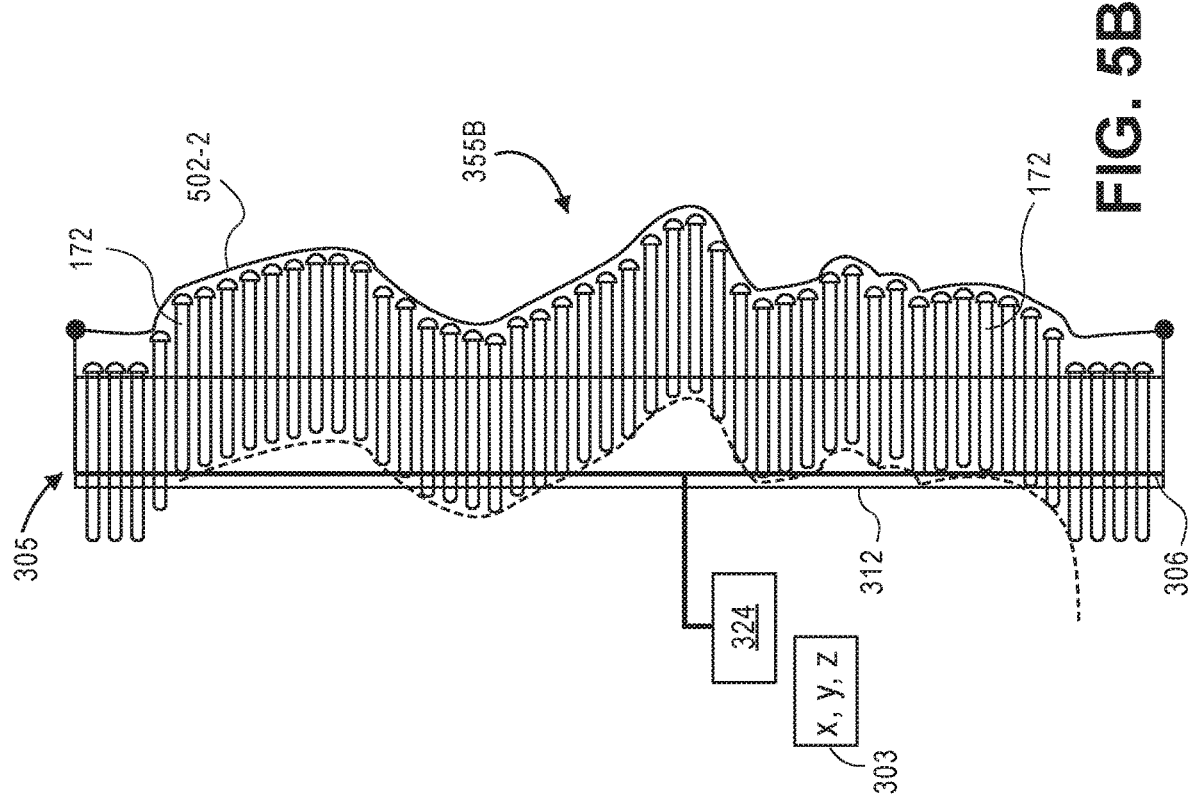
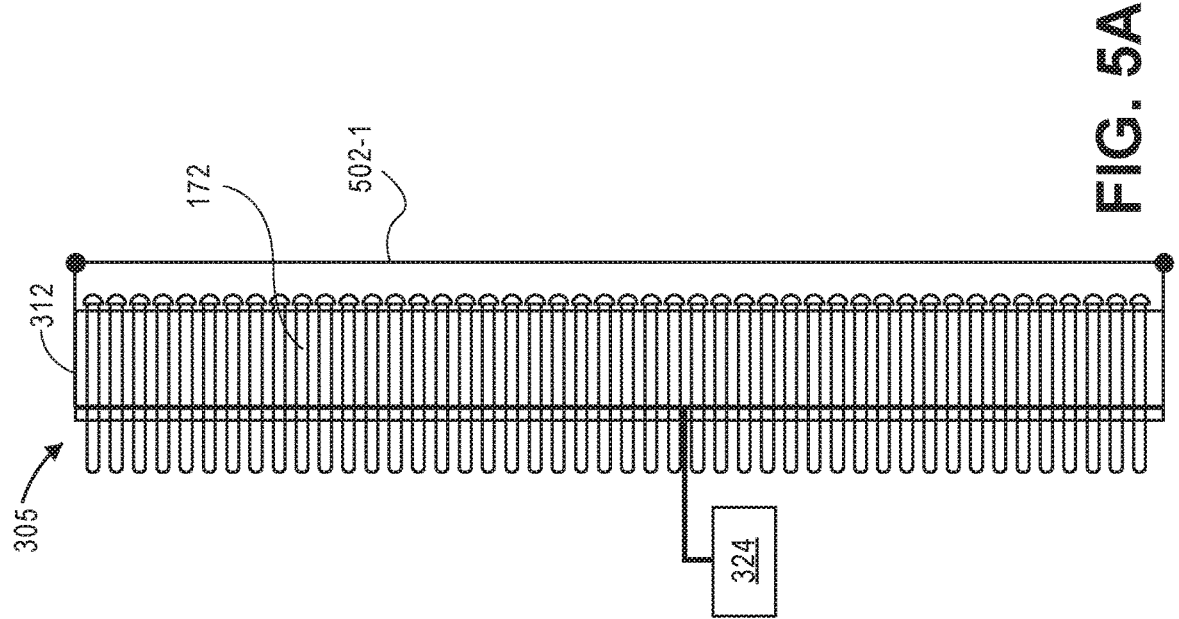

TANGIBLE DISPLAY

BACKGROUND

Remote or virtual communication has advanced greatly in recent years and is now used for both business and social communication between two or more persons, regardless of the physical location of those persons. However, such systems are limited to visual and audible communication and there is currently no ability to convey physical interaction or presence between locations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 5A and 5B illustrate another tangible display, in accordance with described implementations.

Figure 1:
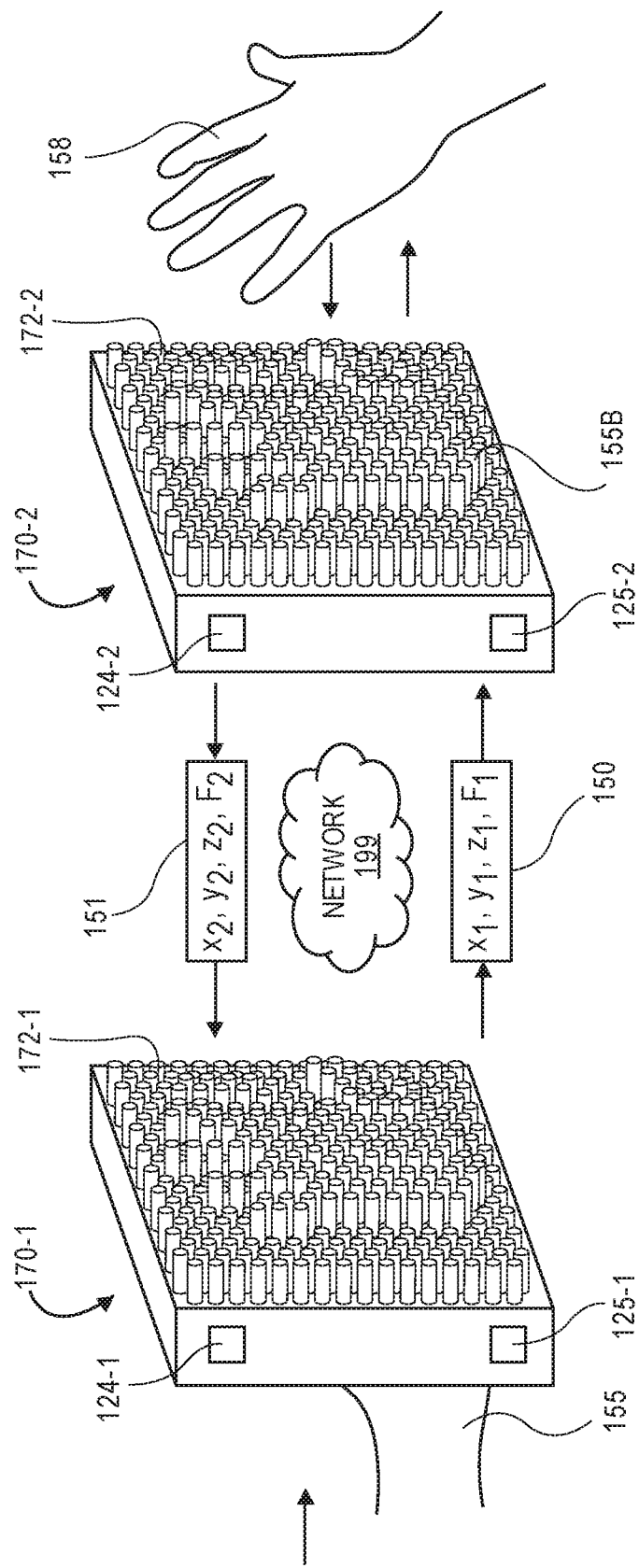
FIG. 1 is a schematic diagram of first tangible display providing depth and force data to a second tangible display, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems, methods, and apparatus described herein relate to tangible displays that allow users to convey three-dimensional presence between remote locations and, in some implementations, force or touch. As described in more detail below, depth data for an object, such as a first user at a first location, may be determined and transmitted over a network, such as the Internet, to a second location that is remote from the first location. The depth data may then be used by a tangible display apparatus at the second location to displace moveable pins on that tangible display apparatus such that the displaced moveable pins form a three-dimensional representation of the object.

In some implementations, a visual representation of the object may also be captured at the first location, transmitted to the second location, and presented concurrently with the three-dimensional representation of the object. For example, an output device, such as a projector, at the second location may project the visual representation of the object onto a surface of the three-dimensional shape formed by the displaced moveable pins. In another example, the moveable pins may each include visible light presentation components, such as fiber optic cable, lucite rod, display on the head of the pin, light emitting diode (LED), laser, etc., through which the visible light may be output, thereby producing the visual representation of the object from light emitting from the ends of the displaced moveable pins.

In still other implementations, the depth of the object at the first location may be determined by the object interacting with a tangible display at the first location, physically displacing moveable pins of that display by a displacement amount and a force. In such an implementation, the depth data may include both three-dimensional information representative of the depth and shape of the object as well as a force applied to each contacted moveable pin when the object interacts with the moveable pins. The depth data may be transmitted from the first location to the second location and used at the second location to displace moveable pins of the tangible display by the displacement amount. In addition, the displacement of the moveable pins at the second location may be displaced with a force used to displace the moveable pins at the first location, thereby conveying both three-dimensional presence and force or touch between the two locations.

In still other examples, the tangible display device may be rotatable between a vertically oriented position in which moveable pins of the display device are horizontally displaced to form three-dimensional representations of objects, such as a three-dimensional representation of a user, and a horizontal position in which the moveable pins are vertically displaced. In the horizontal configuration, the tangible display may be used to generate three-dimensional representations of, for example, topology, terrain, buildings and/or other structures.

In still further example embodiments, the various example tangible displays may be placed, installed, or used within various environments, such as buildings, homes, businesses, retail establishments, offices, conference rooms, phone booths, vehicles, trailers, dedicated pods, or other environments.

FIG. 1 is a schematic diagram of first tangible display 170-1 providing depth and force data to a second tangible display 170-2, according to an implementation. In this example, rather than depth data being generated and provided by a depth sensor, as discussed further below, a first tangible display 170-1 is used to determine depth and force for an object 155 that is brought into contact with the moveable pins 172-1 of the tangible display 170-1. For example, a first tangible display 170-1, which, like the other tangible displays discussed herein, includes a plurality of moveable pins 172-1, a displacement component 124-1, a plate, etc. In this implementation, the first tangible display 170-1 may also include a force sensor 125-1 that measures a force applied to the moveable pins 172-1 when the moveable pins are displaced by contact from the object 155, such as a user's hand. When the object 155 contacts the moveable pins 172-1, the moveable pins are displaced by the object and depth data for each displaced moveable pin is determined by the displacement component 124-1 based on an amount each moveable pin is displaced by the object. Likewise, the force sensor 125-1 may measure a force applied by the object 155 to the moveable pins 170-1. In this example, the depth data 150 sent from the first tangible display 170-1 includes, for each moveable pin, position ($x_1$, $y_1$), depth ($z_1$), and force ($F_1$).

The second displacement component 124-2 of the second tangible display 170-2, upon receiving the depth data 150, utilizes the depth data 150 to displace moveable pins 172-2 of the second tangible display 170-2 by respective displacement amounts to form a three-dimensional representation 155B of the first object 155. Likewise, the received amount of force may be used to displace the moveable pins of the second tangible display 170-2 with the amount of force applied by the first object 155 to the moveable pins 172-1 of the first tangible display 170-1.

In such an example, by displacing moveable pins based on displacement amounts and with an amount of force, a second object, such as a second user's hand 158 may physically interact with and feel the force and/or touch generated by the first object 155, even if those objects are at two different locations. Likewise, the second object 158 may also apply a counter-acting or opposite force to the displaced moveable pins and even move the displaced moveable pins an amount that is opposite to the displaced amount produced from the depth data 150. For example, as the displacement component 124-2 displaces a sub-plurality of the moveable pins of the second tangible display 170-2 with a force in a first direction of the displacement, a second object 158 may push back against the displacement of the moveable pins with a force in a second opposite direction. The force or displacement produced by the second object interacting with the moveable pins of the second tangible display 170-2 is measured by the second force sensors 125-2 and may be transmitted as depth data 151 to the first tangible display 170-1 and used by the first displacement component to produce a force that pushes back against the first object, thereby providing physical feedback to the first object that is generated by the physical interaction by the second object. The exchange of depth data 150, 151 between the first tangible display 170-1 and the second tangible display 170-2 may be done in parallel and adjustments made by each of the displacement components 124 so that objects at each location can feel the force applied by the object at the other location. In this example, if the hand 155 of a first user is pushing against the moveable pins of the first tangible display 170-1 and the hand 158 of the second user is pushing against the moveable pins of the second tangible display 170-2, the force and displacement generated by both objects (first user's hand and second user's hand) are transmitted in parallel between the two tangible displays 170 and used to provide feedback to the users so that each user can feel the force or touch of the other user, even though those users may be at two different locations.

Figure 2:
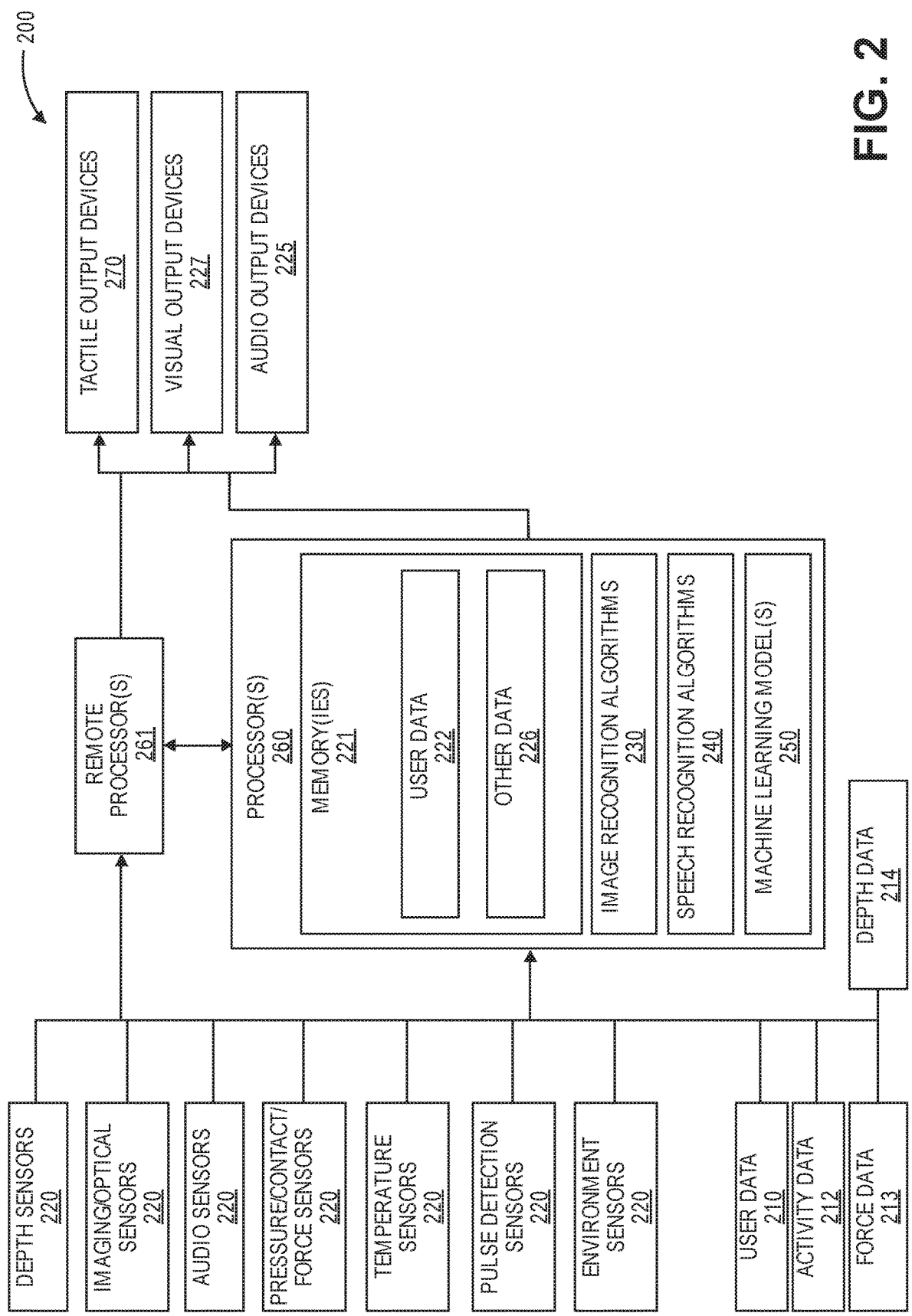
FIG. 2 is a block diagram of an example system architecture associated with an example tangible display, according to an implementation.

FIG. 2 is a block diagram of an example system architecture 200, according to an implementation.

The example system architecture 200 may include one or more processors 260. In addition, the processors 260 may be in communication with and/or receive data from various sensors 220, and/or may receive other data or inputs, such as user data 210, activity data 212, force data 213, depth data 214, or other data. As described herein, the various sensors 220 may include, but are not limited to, imaging or optical sensors, depth sensors, audio sensors, pressure, contact, or force sensors, temperature sensors, heartrate or pulse detection sensors, environment sensors, and/or other types of sensors. The various sensors 220 may detect aspects of the user, objects, the activity, and/or the environment associated with a location, and data or information associated with the detected aspects may be provided to the processors 260.

Further, the processors 260 may also be in communication with and/or transmit data to various output devices 225, 227, 270, and/or may transmit other data, information, or outputs to other computing devices, such as user devices and/or other computing devices, etc. As described herein, the various output devices 225, 227, 270 may include visual output devices, tangible output devices, audio output devices, actuators, temperature or environment control devices, user devices, and/or other types of output devices. The various output devices 225, 227, 270 may be instructed by the processors 260 to initiate various actions or outputs to affect the user, the activity, and/or the environment of the location, and other data, information, or outputs may be presented or displayed to the user via various computing devices.

Further, the example system architecture 200 may also include one or more remote processors 261. The remote processors 261 may also be in communication with and/or receive data from the various sensors 220, and/or may receive other data or inputs, such as user data 210, activity data 212, force data 213, depth data 214, or other data. In addition, the remote processors 261 may also be in communication with and/or transmit data to the various output devices 225, 227, 270 and/or may transmit other data, information, or outputs to other computing devices, such as user devices.

In example embodiments, the processors 260 may be at the same location as the tangible display, and the remote processors 261 may be physically remote from the tangible display while maintaining communication via a network with the tangible display, as well as with different tangible displays at different locations. Further, the remote processors 261 may include any and all of the components and functionality described herein with respect to the processors 260. In this manner, the various processes, methods, operations, and functionality performed by the processors 260 may be distributed between the processors 260 and the remote processors 261 in various combinations.

The distribution of the various processes, methods, operations, and functionality between the processors 260 and the remote processors 261 may be determined as a function of a variety of factors, including type or quantity of data, type of processing, available processing power, current or expected processing load, current or expected network bandwidth, current or expected network latency, or other factors related to processing and communication by and between the processors 260 and remote processors 261.

For example, in example embodiments in which the network latency is relatively high, a greater proportion of processing may be performed locally by the processors 260 in order to avoid processing delays due to the relatively high network latency. In other example embodiments in which the network latency is relatively low, a greater proportion of processing may be performed remotely by the remote processors 261 when such processing delays may be minimal or negligible due to the relatively low network latency. In addition, processing of large amounts of data, e.g., image data, may be performed locally by the processors 260 to avoid limitations and delays due to network bandwidth and network latency required to transmit and receive such large amounts of data to and from the remote processors 261. Further, if the remote processors 261 currently have a high processing load, then processing of data may be performed locally by the processors 260, or vice versa. Various other factors or combinations of factors may also affect the distribution of processing and operations between the processors 260 and remote processors 261 at any particular time.

The processors 260 and/or remote processors 261 may be any suitable type or category of processors, such as graphics processing units (GPUs), central processing units (CPUs), other types of processors, or combinations thereof. The processors 260 and/or remote processors 261 may be designed and/or configured to perform the processes, methods, operations, and functionality described herein. For example, as shown in FIG. 2, the processors 260 and/or remote processors 261 may include one or more image recognition algorithms 230, one or more speech recognition algorithms 240, and/or one or more machine learning models 250. In addition, the processors 260 and/or remote processors 261 may also include various other algorithms or models to perform various other processes, methods, operations, and functionality described herein related to any of the described aspects by various sensors and/or any of the various actions or outputs via the various output devices.

Further, the processors 260 and/or remote processors 261 may include one or more memories 221 in which various data items may be stored. For example, the memories 221 may include user data 222 of users and/or activities, which may include visual or optical imaging data, depth imaging data, infrared imaging data, other types of imaging data, audio data, depth data, etc.

The user data 222 may be provided by the user and/or may be determined using one or more of the image recognition algorithms 230, speech recognition algorithms 240, and/or machine learning models 250, as further described herein. Furthermore, the memories 221 may also include various other data 226, which may include data or information associated with the various sensors, data received from the various sensors, user data or other stored aspects of users, activity data or other stored aspects of activities, various outputs or results of processing or operations of the image recognition algorithms, speech recognition algorithms, machine learning models, or other algorithms or models, data or information associated with the various output devices, instructions transmitted to or to be transmitted to the various output devices, and/or various other data items associated with the processes, methods, operations, and functionality described herein.

In example embodiments, the image recognition algorithms 230 may comprise various types of image recognition or machine vision algorithms or models that may receive imaging data, e.g., one or more images and/or video files or streams, from one or more imaging devices and process such received imaging data in order to recognize one or more features expressed in the imaging data. Information and/or data regarding features expressed in imaging data, including colors, textures, depths, or outlines of the features, may be extracted from the data in any number of ways. For example, colors of pixels, or of groups of pixels, in imaging data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features expressed in imaging data may be identified using one or more computer-based methods, such as by identifying changes in intensities within regions or sectors of the imaging data, or by defining areas of imaging data corresponding to specific surfaces, edges, lines, shapes, or other features.

Furthermore, edges, contours, outlines, colors, textures, silhouettes, shapes, features, or other characteristics of objects, or portions of objects, expressed in imaging data may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes, features, or other characteristics of objects or portions thereof) within the imaging data, and in a manner that minimizes noise and disruptions and does not create false transitions. Some algorithms or techniques that may be utilized in order to recognize one or more features expressed in the imaging data include, but are not limited to, Canny edge detectors or algorithms; Sobel operators, algorithms or filters; Kayyali operators; Roberts edge detection algorithms; Prewitt operators; Frei-Chen methods; or any other algorithms, models, or techniques including machine learning algorithms or techniques that may be known to those of ordinary skill in the pertinent arts.

Once the features or characteristics of objects or portions thereof have been recognized in the imaging data, such features or characteristics of the objects or portions thereof may be matched against known or learned information regarding edges, contours, outlines, colors, textures, silhouettes, shapes, or other known or learned features or characteristics expressed in the imaging data, which may be stored in one or more data stores or memories. In this regard, features or characteristics of objects or portions thereof may be recognized and/or classified based at least in part on the extent to which the features or characteristics identified in the imaging data corresponds to one or more of the known or learned features or characteristics expressed in the imaging data.

In addition, the image data corresponding to the recognized objects may be aligned with and/or assigned depth values or depth data for the objects represented in the image data based on depth data obtained from the depth sensors 220. Likewise, in some implementations, force data or an amount of force may be assigned to the image data based on force data 213 obtained from pressure/contact/force sensors 220. Alignment of the image data, depth data, and/or force data may be done based on, for example, known positions of the imaging/optical sensors, depth sensors, and/or pressure/contact/force sensors, by aligning the image data, depth data, and/or force data based on uniquely identifiable objects or markers at specific coordinates or positions within the location, etc. For example, an alignment marker may be positioned such that it is detectable by each of the sensors (e.g., imaging sensor, depth sensor) that is used to align and assign horizontal, vertical, and depth data between the depth data and image data. As another example, the imaging/optical sensors and the depth sensors may be incorporated into the same physical components, such as a depth sensing camera and the image data and depth data generated by the sensors may be pre-aligned.

In example embodiments, the speech recognition algorithms 240 may comprise various types of speech recognition or sound recognition algorithms or models that may receive audio data, e.g., one or more audio files and/or streams, from one or more audio input devices and process such received audio data in order to recognize one or more aspects of speech or sounds expressed in the audio data that may relate to speed, cadence, tone, tenor, timbre, pitch, volume, inflection, content, choice of language or words, syncing or mimicking speech, other aspects of speech or other sounds, or other audio features.

In some example embodiments, audio data may be decomposed into one or more constituent parts using a Fourier transformation or decomposition, such as a cepstrum analysis. For example, audio data may be decomposed based on one or more continuous transforms (e.g., Laplace transforms, Mellin transforms, Hartley transforms) or discrete transforms, or any other relevant algorithm or technique for recognizing aspects of sounds within audio data based on their respective characteristics. In other example embodiments, the audio data may be processed to identify characteristics of such sounds, including but not limited to speed, cadence, tone, tenor, timbre, pitch, volume, inflection, content, choice of language or words, syncing or mimicking speech, other aspects of speech or other sounds, or other audio features. Further, one or more natural language processing engines or techniques may evaluate audio data and/or characteristics of sounds and mine any text, words, phrases or phonemes therefrom.

Audio data may be classified or weighted in any number of ways based at least in part on any one or more of the recognized aspects of such speech or other sounds. For example, in some example embodiments, sounds may be classified or weighted based on their content or choice of language or words. In other example embodiments, sounds may be classified or weighted based on any speeds, cadences, pitches, tones, volumes, inflections, or other characteristics with which such words are spoken, or any other characteristics of such words. In addition, any algorithms or techniques for recognizing phonemes, words or patterns within speech, e.g., for recognizing isolated or connected words, or continuous or spontaneous speech, may be utilized in accordance with the present disclosure. For example, in some example embodiments, the systems and methods disclosed herein may be configured to recognize speech according to acoustic phonetic approaches, pattern recognition approaches, template-based approaches, stochastic modeling, dynamic time warping, vector quantization, or artificial intelligence or other knowledge-based approaches implemented using one or more machine learning algorithms or techniques.

Furthermore, any strategies for detecting, recognizing or classifying sounds or characteristics of sounds, e.g., according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses, may be utilized in accordance with the present disclosure. Using any of the foregoing algorithms or techniques, or any other algorithms or techniques, characteristics of speech or other sounds within audio data may be determined.

Although FIG. 2 shows image recognition algorithms 230 and speech recognition algorithms 240, various other types of algorithms (not shown) may also be included as part of the example system architecture 200 in order to receive and process detected aspects by the various sensors other than imaging data, depth data, and/or audio data. For example, other processing algorithms, such as machine learning algorithms or techniques or other types of algorithms or techniques described herein, may be used to process data received from pressure or contact sensors, temperature sensors, heartrate or pulse detection sensors, environment sensors, as well as to process user data, activity data, or any other data. In example embodiments, the processing algorithms may process the detected aspects in order to identify, recognize, or classify various aspects of the user, activity, and/or the environment.

In example embodiments, the machine learning models 250 may comprise various types of machine learning algorithms, techniques, or models that may receive various data, e.g., detected aspects from the various sensors, data or inputs such as user data, activity data, and/or other data, and/or results or outputs from various processing algorithms such as image recognition algorithms, speech recognition algorithms, and/or other processing algorithms, and process such received data, as well as to determine one or more actions or outputs to initiate via various output devices. Example machine learning models 250 may comprise artificial neural networks, deep neural networks, or any other machine learning algorithms, techniques, or models.

Machine learning models or tools, such as artificial neural networks, have been utilized to identify relations between respective elements of apparently unrelated sets of data. An artificial neural network is a parallel distributed computing processor comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses, have been utilized in various data processing applications.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. Likewise, each of the neurons within a network may be understood to have different activation or energy functions; in this regard, such a network may be dubbed a heterogeneous neural network. In some neural networks, at least one of the activation or energy functions may take the form of a sigmoid function, wherein an output thereof may have a range of zero to one, or 0 to 1. In other neural networks, at least one of the activation or energy functions may take the form of a hyperbolic tangent function, wherein an output thereof may have a range of negative one to positive one, or −1 to +1. Further, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information specifically flows in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize the error in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

In example embodiments, the machine learning models 250 may be trained using detected aspects from the various sensors of users, activities, and/or environments, data or inputs such as user data, activity data, and/or other data, and/or results or outputs from various processing algorithms such as image recognition algorithms, speech recognition algorithms, and/or other processing algorithms, as well as actions or outputs initiated via various output devices, and/or feedback from users related to activities. The feedback from users may include ratings, rankings, comments, or other types of feedback related to users, activities, detected aspects, initiated actions, or combinations thereof, which feedback may be provided during or after completion of various activities.

Although FIG. 2 shows image recognition algorithms 230, speech recognition algorithms 240, and machine learning models 250 as separate components within the example system architecture 200, each of these algorithms, techniques, or models may be combined in various manners. For example, the image recognition algorithms 230, speech recognition algorithms 240, and other processing algorithms may provide respective outputs to the machine learning models 250. In other example embodiments, the image recognition algorithms 230, speech recognition algorithms 240, and other processing algorithms may form a part of or be wholly integrated into the machine learning models 250. In further example embodiments, the image recognition algorithms 230, speech recognition algorithms 240, and other processing algorithms may form separate processing components within the machine learning models 250. Various other combinations of the image recognition algorithms 230, speech recognition algorithms 240, other processing algorithms, and machine learning models 250 are also possible within the example system architecture 200. Moreover, the image recognition algorithms 230, speech recognition algorithms 240, other processing algorithms, and machine learning models 250 may also be distributed and/or replicated on the remote processors 261 in various manners and combinations. Likewise, the memories 221 may also be distributed and/or replicated on the remote processors 261 in various manners and combinations.

Figure 3:
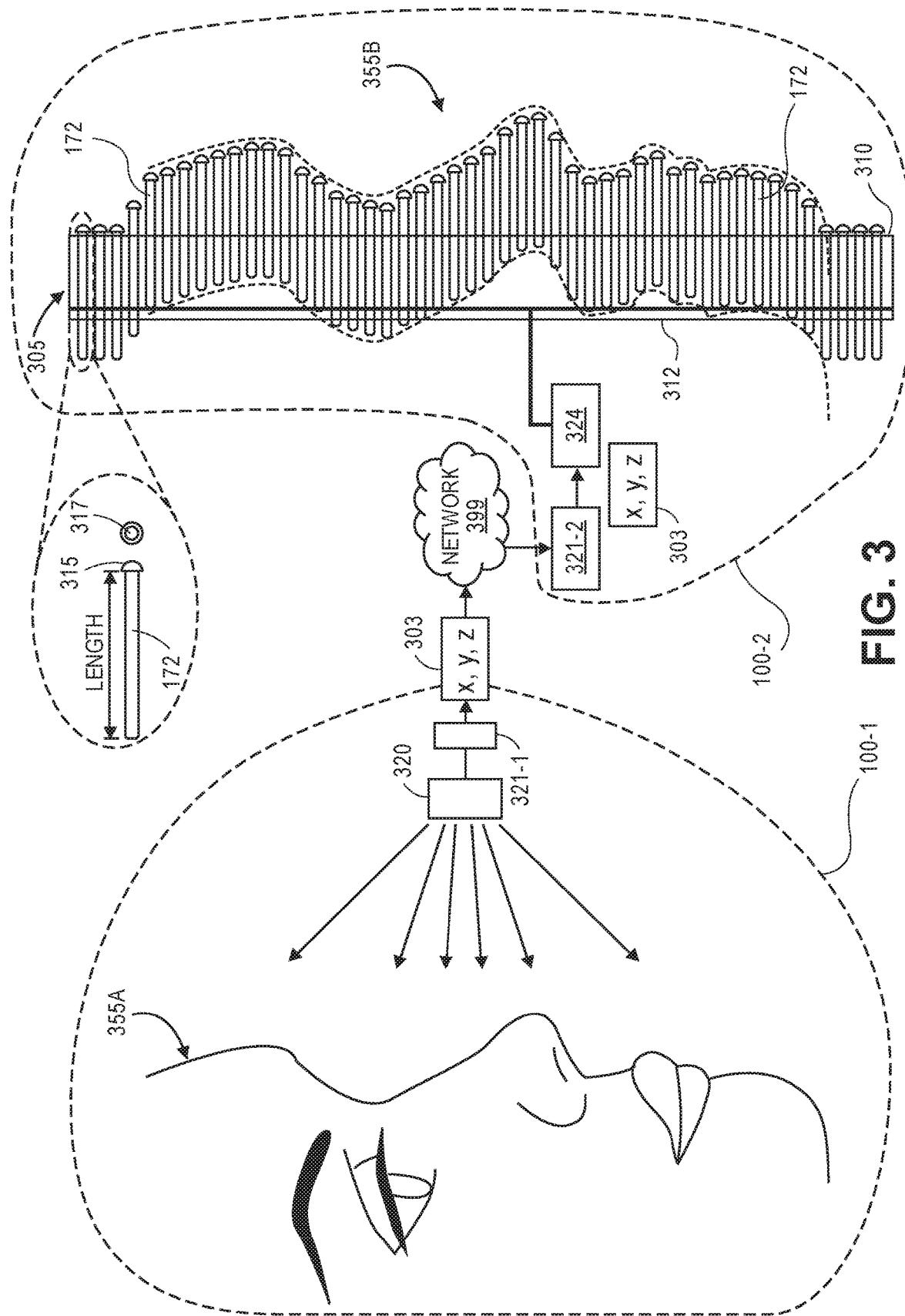
FIG. 3 is a schematic diagram of a sensor at a first location generating depth data for an object that is transmitted to a second location and used to generate a three-dimensional representation of that object on a tangible display, according to an implementation.

FIG. 3 is a schematic diagram of a sensor 120 at a first location 100-1 generating depth data 303 for an object 355A that is transmitted to a second location 100-2 and used to generate a three-dimensional representation 355B of that object on a tangible display 305, according to an implementation. As discussed above, the sensor 320 may be any type of depth sensor (e.g., fixed structured light sensors, programmable structured light sensors (DLP), time of flight (ToF) sensors, camera array sensors, stereoscopic sensors) that may be used to generate depth data 303 representative of an object 355A, such as a user at the first location. In some implementations, the depth sensor may be incorporated into and part of an imaging element that also generates image data representative of the object 355A.

At the first location 100-1, the sensor 320 is communicatively coupled to a first communication component 321-1, such as a wired or wireless transmitter/receiver that is configured to transmit the depth data 303 from the first location. For example, the first communication component 321-1 may transmit the depth data 303 via a network 399, such as the Internet, to a second location 100-2.

In this example, the second location includes a second communication component 321-2 that receives the depth data 303 and provides the depth data to a displacement component 324 at the second location. The displacement component may be part of or separate from the tangible display 305 but in communication with the tangible display 305.

The tangible display 305 includes a plate 312 having a thickness, such as three inches, that forms a substantially flat planar surface. The plate 312 may be formed of any rigid material such as plastic, wood, titanium, aluminum, etc. In some implementations, the plate 312 may be formed in whole or in part of an electrically conductive material. Alternatively, the plate may be formed in whole or in part of an insulating material. In still other examples, portions of the plate may be electrically conductive and other portions may provide insulation or be non-conductive. The plate 312 also includes a plurality of apertures 310 or holes into which moveable pins 172 are positioned. The diameter or size of each aperture 310 is slightly larger than the diameter or thickness of the moveable pin inserted into the respective aperture. In some implementations, the apertures may be uniformly aligned in columns and rows. In other implementations, the columns and rows may be staggered or offset. In still other examples, the apertures may be randomly positioned on the plate 312.

As illustrated in the expanded view, the moveable pins 172 have a length and a thickness or diameter. In some implementations, the pins may only be inches (or smaller) in length and the thickness or diameter may only be a few centimeters. In other implementations, the pins may be several feet long and the thickness or diameter of the moveable pins may be several inches or feet, such that a very large tangible display may be created.

The moveable pins 172 may be formed of any type of substantially rigid material to enable them to be repeatedly displaced and retracted with respect to the plate 312. For example, the moveable pins 172 may be formed of plastic, metal, wood, glass, etc. Likewise, the moveable pins 172 may be cylindrical, as illustrated, or have another shape, such as oval, triangular, square, etc. In addition, in some implementations, the moveable pins 172 may include a head 315 that is larger than the thickness or diameter of the moveable pin and larger than the aperture into which the moveable pin is inserted. The head 315 may be flat, concave, convex (as illustrated) or any other shape. In some, implementations, as illustrated by the face-on view of the moveable pin 172, the moveable pin may include a visible light presentation component 317 affixed to the head 315 of the moveable pin and/or that extends through the length of the moveable pin 172 and which is configured to emit visible light from the head 315 of the moveable pin 172. The visible light presentation component may be any component that is capable of transmitting and outputting visible light. For example, the visible light presentation component 317 may be formed of or include a visual display mounted on the head 315 of the moveable pin 172, a fiber optic cable that traverses though the pin and emits light from the head of the pin, an LED, an organic light emitting diode (OLED), a laser, etc.

The plurality of moveable pins 172 of the tangible display 305 may all be uniform in size, shape material, etc. In other implementations, the size, shape, material, visible light presentation component, etc., of one or more moveable pins 172 of the tangible display may vary from other moveable pins of the tangible display 305.

The displacement component 324 may be any form of displacement component that can individually address each of the moveable pins 172 and cause the moveable pins to be displaced. For example, the displacement component may include an actuation device, such as electromechanical solenoids that may be addressed by horizontal and vertical (row:column) positions that are operable to displace one or more moveable pins by a displacement amount (z). In other implementations, the displacement component may include a mechanical actuation device that includes pistons or drivers at each moveable pin that may be used to displace or retract the respective moveable pin 172. In still other examples, the displacement component 324 may include an actuation device that uses pneumatics, hydraulics, magnetics, etc., to move the pins 172. The displacement component may also be configured to displace the moveable pins with a defined amount of force that is indicated in the received depth data. Likewise, in some implementations, the displacement component may be able to produce an opposing force or friction in response to an object contacting moveable pins to displace those moveable pins.

In some implementations, the displacement component 324 may maintain position information for each moveable pin 172 of the tangible display 305 and, upon receipt of depth data 303 determine a displacement amount for each moveable pin so that the tangible display produces a three-dimensional representation corresponding to the received depth data 303. In some implementations, this may include the displacement component interpolating or determining a displacement amount for some or all of the moveable pins based on the received depth data 303. For example, if the depth data is at a lower resolution than the configuration of moveable pins, the displacement component may utilize the depth data to directly determine displacement amounts for some of the moveable pins and compute average or median displacement amounts for other moveable pins so that the resulting three-dimensional representation provides a proper contour or shape corresponding to the received depth data 303.

In the example illustrated with respect to FIG. 3, the sensor 320 at the first location 100-1 generates depth data 303 representative of an object 355A, in this example a face. The depth data is transmitted by the first communication component 321-1, via the network 399, to the second communication component 321-2 at the second location 100-2. The depth data 303 is then used by the displacement component 324 to determine at least a sub-plurality of the plurality of moveable pins 172 of the tangible display 305 to displace by respective displacement amounts such that, when displaced, the sub-plurality of moveable pins 172 form a three-dimensional representation 355B of the object 355A at the second location.

Figure 4:
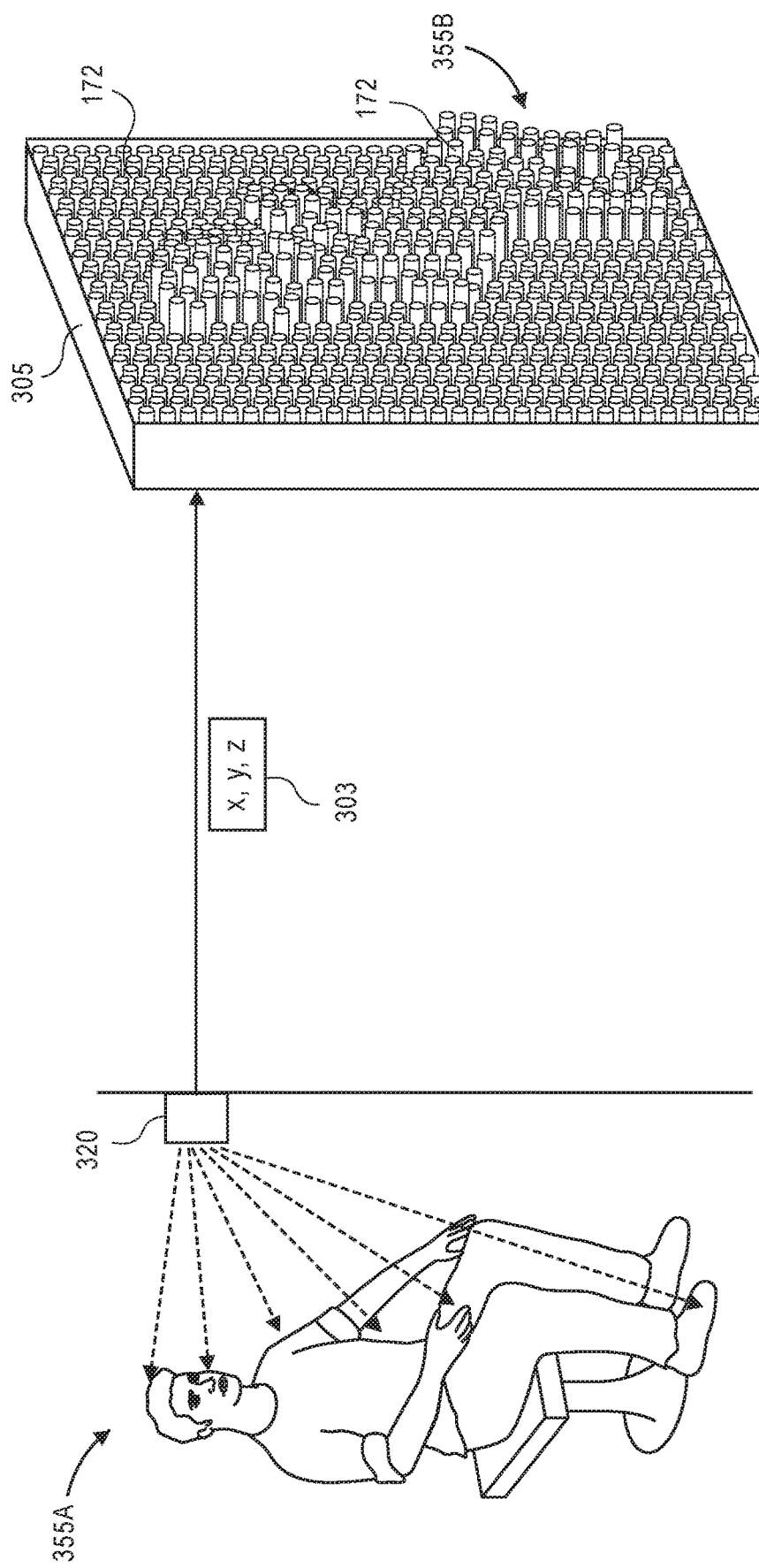
FIG. 4 is a schematic diagram of a depth sensor providing depth data to a tangible display, according to an implementation.

By transmitting depth data from a first location to a second location and using that depth data to produce a three-dimensional representation at a second location of an object that is at the first location, depth based presence between the two locations can be enhanced. For example, as discussed herein, with the disclosed implementations, both visual and physical/tangible attributes may be conveyed between two locations. For example, FIG. 4 is a schematic diagram of a depth sensor 320 providing depth data 303 to a tangible display 305, according to an implementation. In this example, the depth sensor 320 generates depth data 303 of an object 355A, in this example a user, that is used to displace moveable pins 172 of a tangible display 305 to form a three-dimensional representation 355B of the object 355A. As roughly illustrated, a sub-plurality of the plurality of moveable pins 172 of the tangible display 305 are displaced and extend outward from the tangible display 305, thereby creating the three-dimensional representation. Likewise, some of the displaced moveable pins 172 extend further than other displaced moveable pins, thereby providing three-dimensional contours and shapes corresponding to the depth data.

In this example, the depth sensor 320 may be coupled directly to the tangible display 305 and the object 355A, depth sensor 320, and tangible display 305 may all be at a common location. In other implementations, as discussed elsewhere herein, the depth sensor 320 and object 355A may be at a first location and the tangible display 305 may be at a second location that is separate and remote from the first location. In such an example, the depth data 303 may be transmitted from the first location to the second location via a network, such as the Internet.

FIGS. 5A and 5B illustrate another tangible display, in accordance with described implementations. Turning first to FIG. 5A, illustrated is a schematic side-view of a tangible display 305 that includes a plate 312, a plurality of moveable pins 172 that are positioned within apertures of the plate 312 and moveable with respect to the plate 312, and a displacement component 324 that is operable to cause each of the plurality of moveable pins 172 to be displaced by a respective displacement amount, thereby forming a three-dimensional representation of an object based on depth data received by the displacement component.

In this example, a flexible membrane 502 is positioned adjacent and in front of the moveable pins 172. The flexible membrane may be formed of any flexible or semi-flexible material such as, but not limited to, elastic, rubber, plastic, canvas, etc. In such an implementation, as illustrated in FIG. 5B, when the moveable pins are displaced by respective displacement amounts, determined by the displacement component 324 based on received depth data 303, the displaced moveable pins 172 contact the flexible membrane 502 such that the flexible membrane takes or forms the three-dimensional shape represented by the displaced moveable pins 172, as illustrated by the contoured flexible membrane 502-2.

Through use of a flexible membrane, the number of moveable pins 172 may be reduced without losing the detail or fidelity of the rendered three-dimensional representation because the flexible membrane forms the contours between the moveable pins and covers any gaps between the moveable pins. Likewise, in implementations in which visual data of the object is projected onto the surface formed by the moveable pins 172, the image data may be projected onto the flexible membrane 502-2.

In addition, in some implementations, the tangible display 305 may be rotatable between the vertical position, in which the moveable pins 172 are displaced in a horizontal direction, as illustrated in FIGS. 5A and 5B, to a horizontal position so that the moveable pins are displaced in a vertical direction. In such an implementation, the vertically displaced moveable pins may be used to produce three-dimensional representations of topology, terrain, buildings, etc. Likewise, if the tangible display 305 includes a flexible membrane that is water impermeable, three-dimensional representations of terrains or contours may be formed, and water added to illustrate motion, how the water will react or respond to the contours/terrain, etc.

While the above example illustrated in FIGS. 5A and 5B show the flexible membrane being separate from and adjacent to the moveable pins when the moveable pins are retracted, in some implementations, the flexible membrane may be physically coupled to some or all of the heads of the moveable pins. Coupling the flexible membrane to some or all of the moveable pins increases the ability to form three-dimensional objects as some moveable pins may be displaced and others retracted, causing the flexible membrane to extend and retract in a contour similar to that of the position of the moveable pins.

Figure 6:
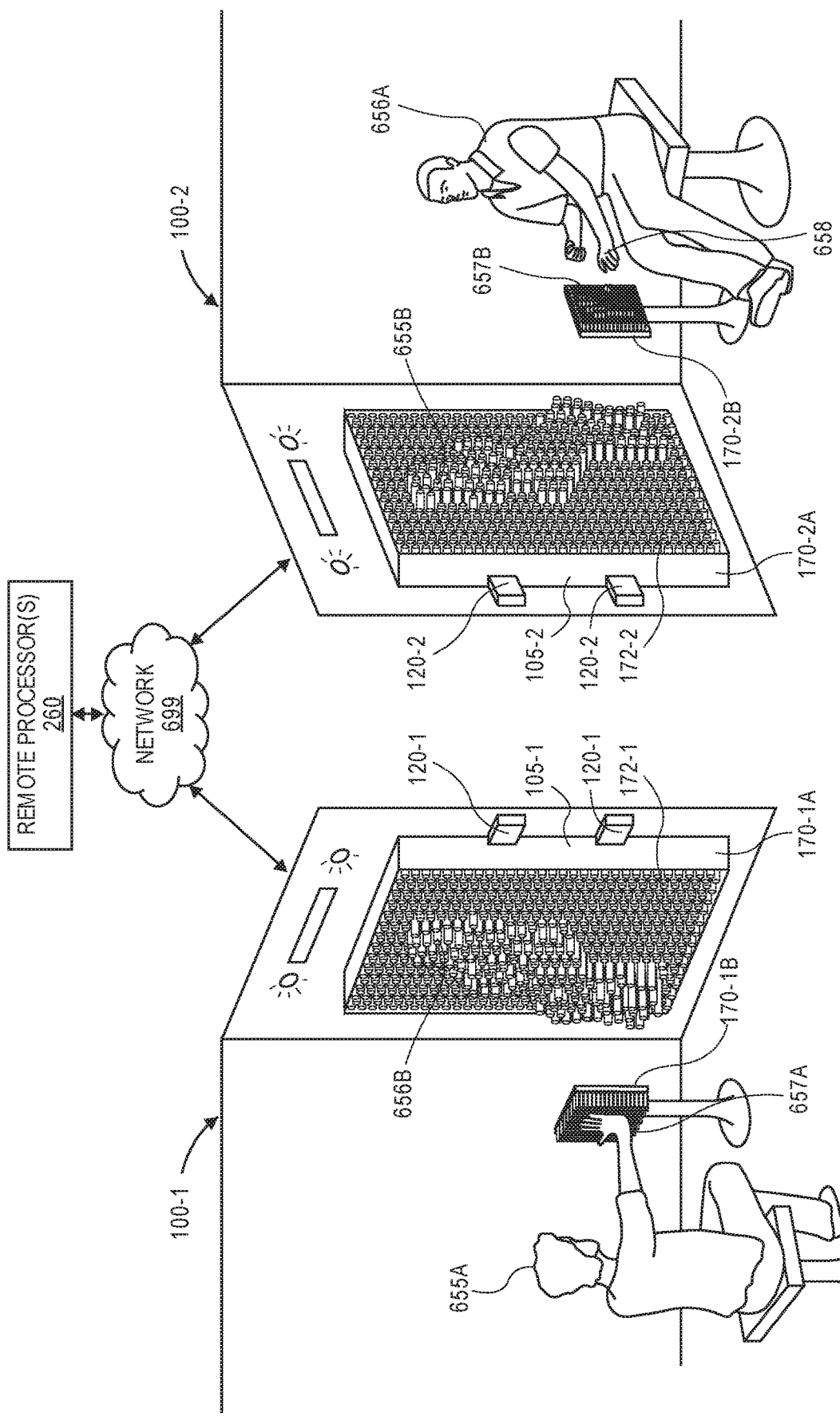
FIG. 6 is a schematic diagram of a first tangible display at a first location and a second tangible display at a second location, according to an implementation.

FIG. 6 is a schematic diagram of a first location 100-1 with two tangible displays 170-1A, 170-1B in communication with a second location 100-2 with two tangible displays 170-2A, 170-2B, according to an implementation.

In this example, one of the tangible displays 170-1A, 170-2A at each location is used to produce a three-dimensional representation of the user at the other location based on depth data determined from depth sensors 220 at the respective location. For example, at the first location, depth sensors 220-1 generate first depth data representative of the first user 655A that is conveyed from the first location 100-1 to the second location 100-2. At the second location 100-2, the first depth data is used to generate a three-dimensional representation 655B of the first user 655A using moveable pins of the tangible display 170-2A of the second location. Similarly, the sensors 220-2 of the second location generate second depth data representative of the second user 656A that is conveyed from the second location 100-2 to the first location 100-1. At the first location 100-1, the second depth data is used to generate a three-dimensional representation 656B of the second user 656A using moveable pins of the tangible display 170-1A of the first location.

In addition, in this example, the first user 655A directly interacts with the tangible display 170-1B at the first location 100-1 to displace moveable pins of the tangible display 170-1B by a displacement amount and with a displacement force that is applied by the user's hand 657A as it presses against the moveable pins to displace those moveable pins. The displacement amounts and forces measured for each moveable pin of the tangible display 170-1B (collectively depth data) is conveyed as third depth data from the first location 100-1 to the second location 100-2. At the second location 100-2, the third depth data is used to generate a three-dimensional representation 657B of the first user's hand 657A using moveable pins of the tangible display 170-2B of the second location. To convey touch and feeling between the locations, the force data included in the third depth data is used to displace the moveable pins of the tangible display 170-2B with an amount of force similar to the force applied to the moveable pins at of the tangible display 170-1B. The second user 656A may feel the force generated by the first user through physical interaction with the moveable pins of the tangible display 170-2B. For example, the second user may place their hand 658 against the moveable pins of the tangible display 170-2B to feel the force used to displace the moveable pins, which is representative of the force used by the first user to displace the moveable pins of the tangible display 170-2A.

The second user may convey touch or force back to the first user by interacting with the moveable pins of the tangible display 170-2B. For example, as the moveable pins of the tangible display 170-2B are displaced in response to the third depth data. The second user 656A may press their hand against the moveable pins and apply an opposing force to those moveable pins. The opposing force applied by the hand 658 of the second user 656A, and any displacement of the moveable pins as a result thereof, may be conveyed as fourth depth data from the second location 100-2 to the first location 100-1. At the first location, the fourth depth data is utilized by the tangible display 170-1B to apply an opposing force, representative of the touch or force produced by the hand 658 of the second user 656A, against the hand 657A of the first user 655A.

Figure 7:
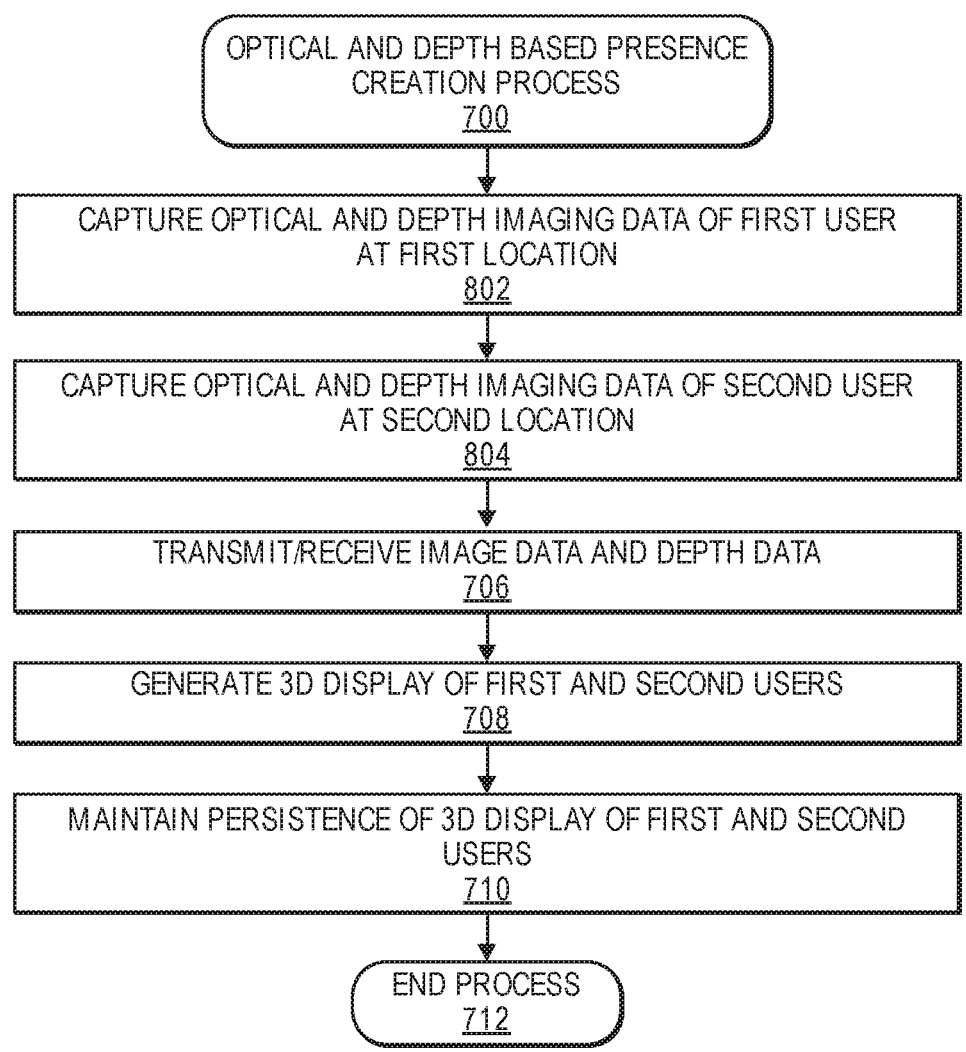
FIG. 7 is a flow diagram of an example optical and depth based presence creation process, according to an implementation.

FIG. 7 is a flow diagram illustrating an example optical and depth based presence creation process 700, according to an implementation.

The process 700 may begin by capturing optical and depth imaging data of a first user in a first location, as at 702. The first user may be seated or may be standing within the first location. One or more imaging devices may capture optical, depth, infrared, or other types of imaging data of the first user. In example embodiments, one or more imaging devices may be positioned and/or oriented to capture imaging data of the first user generally from the perspective of a display device that the first user is facing, e.g., using a combination of an imaging device, sensors, etc. In other example embodiments, one or more imaging devices, sensors, and/or filter devices may be positioned and/or oriented to capture imaging data of the first user from various other perspectives within the first location.

The process 700 may continue by capturing optical data and depth imaging data of a second user in a second location, as at 704. The second user may be seated or may be standing within the second location. One or more imaging devices may capture optical, depth, infrared, or other types of imaging data of the second user. In example embodiments, one or more imaging devices may be positioned and/or oriented to capture imaging data of the second user generally from the perspective of a display device that the second user is facing, e.g., using a combination of an imaging device, sensor and/or a filter device. In other example embodiments, one or more imaging devices, sensors, and/or filter devices may be positioned and/or oriented to capture imaging data of the second user from various other perspectives within the second location.

The process 700 may then continue by transmitting from the first location to the second location, first image data and first depth data for the first user and transmitting from the second location to the first location, second image data and second depth data for the second user, as at 706. As discussed above, image data and depth data may be transmitted between locations via a network, such as the Internet, or any other communication channel.

As the image data and the depth data are received at each location, the image data is visually presented at the location and the depth data is used to produce a three-dimensional representation of the user or other object(s) represented in the depth data, as at 708. As discussed above, the visual presentation and the three-dimensional representation may be presented concurrently with the image data projected or presented on the three-dimensional representation. For example, a tangible display may produce the three-dimensional representation of a user or other object(s) represented in the depth data by displacing moveable pins of the tangible display. Concurrently, a projector or other output device may project the visual presentation of the user or other object(s) represented in the visual data onto a surface formed by the three-dimensional representation. In another example, the moveable pins may include visible light presentation components that are used to output visible light that forms images from the image data.

The process 700 may then proceed by maintaining persistence of the displayed images and the three-dimensionally rendered first and second users, as at 710. The process 700 may then end, as at 712.

Figure 8:
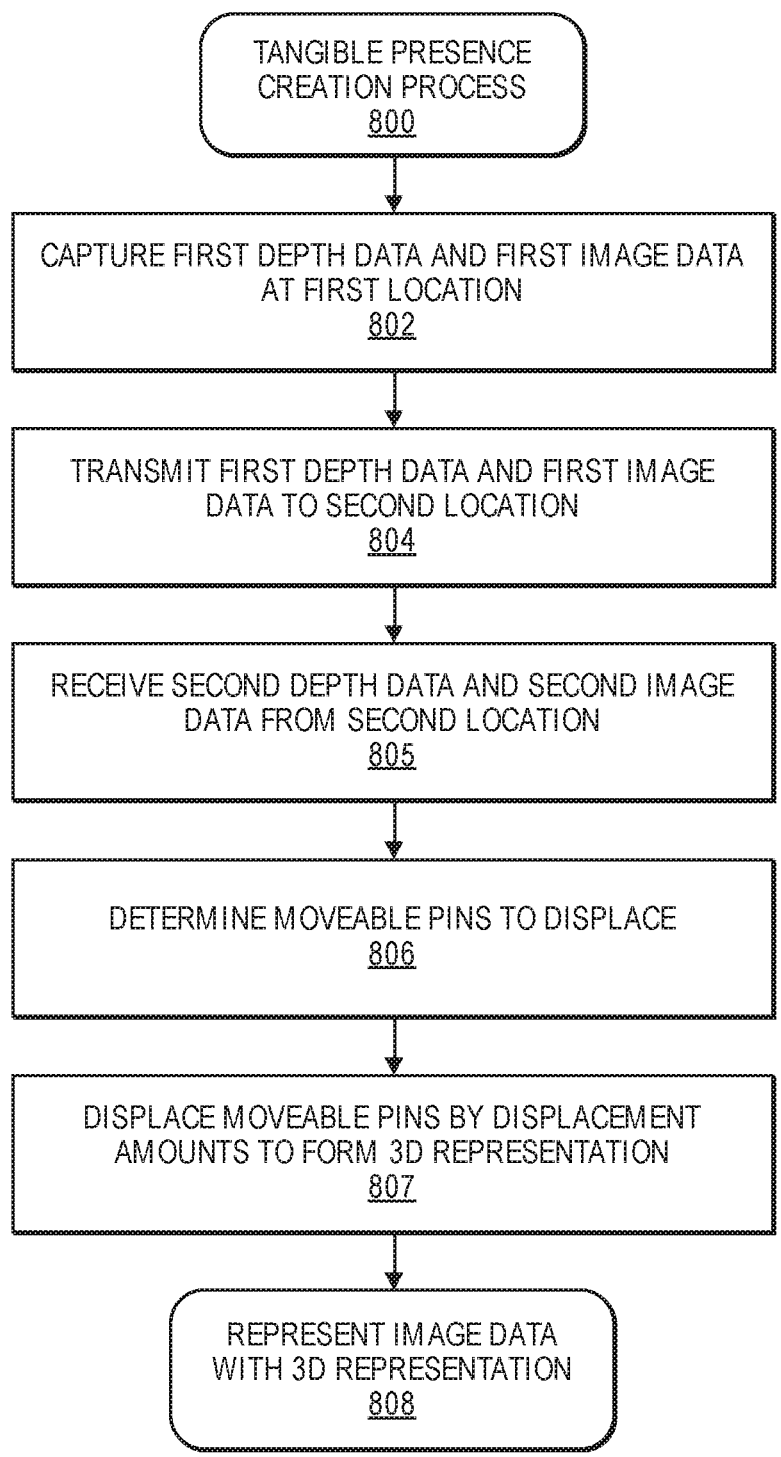
FIG. 8 is a flow diagram of an example tangible presence creation process, according to an implementation.

FIG. 8 is a flow diagram of an example tangible presence creation process 800, according to an implementation. While the example process is described with two locations exchanging depth data and image data to generate tangible presence in the two locations, in other implementations, one location may send depth data and image data to multiple locations (one to many), such as for a presentation or lecture, or many locations may send depth data and image data to many other locations (many to many), or to a single location (many to one). In still other examples, one or more locations may only be capable of transmitting and/or rendering image data or depth data and, as a result, may only transmit one of the depth data or image data.

The example process 800 begins by capturing first depth data and first image data of a first user and/or other first objects in a first location, as at 802. While the first depth data and first image data are captured at the first location, second depth data and second image data are also captured at a second location. As discussed above, a location may include depth sensors that may be used to determine a shape or depth of a user and/or other objects at a location, and may also include an imaging device, such as a camera that generates image data, such as video. In some implementations, the depth sensor and the imaging device may be a single unit that collects both the depth data and the image data concurrently.

As the first depth data and first image data is generated, it is transmitted from the first location to a second location, as at 804. Transmission of the image data and depth data may be done using any communication network, such as the Internet. Likewise, second depth data and second image data generated at the second location is received at the first location, as at 805.

As the second depth data and second image data is received at the first location, the depth data is processed to determine a sub-plurality of the plurality of moveable pins of a tangible display at the first location that are to be displaced, and a respective displacement amount for each of moveable pin of the sub-plurality of moveable pins, as at 806. For example, the moveable pins of a tangible display at the first location may have a first density and arrangement. The depth data may be mapped to the moveable pins such that the second user and/or other objects represented in the second depth data are presented at a size and position on the tangible display corresponding to a size and position of objects at the first location, as discussed above.

The example process 800 may then displace the sub-plurality of moveable pins, each by a respective displacement amount, to form the three-dimensional representation of the second user or other objects represented in the second depth data, as at 807. As the three-dimensional representation of the second user or other second objects represented in the second depth data is produced, the visual presentation of the second user and/or other second objects is output and presented concurrently with the three-dimensional representation, as at 808. As discuss above, the visual presentation may be projected from a camera or other output device onto a surface formed by the displaced sub-plurality of moveable pins. In other implementations, the moveable pins of the tangible display may include visible light presentation components that are used to output the visual presentation of the second user and/or other second objects concurrent with the three-dimensional representation thereof.

As depth data and image data is received, the three-dimensional representation and visual presentation may be updated and adjusted based on the received data, thereby providing both a visual and tangible presence of the second user and/or other second objects in the first location. In some implementations, as discussed above, the depth data may also include force data indicating an amount of force applied by the second user or the other second objects at the second location and that force data may be used to displace the sub-plurality of moveable pins with a similar amount of force. Conveying force data provides yet another component to the tangible presence between two or more locations.

Figure 9:
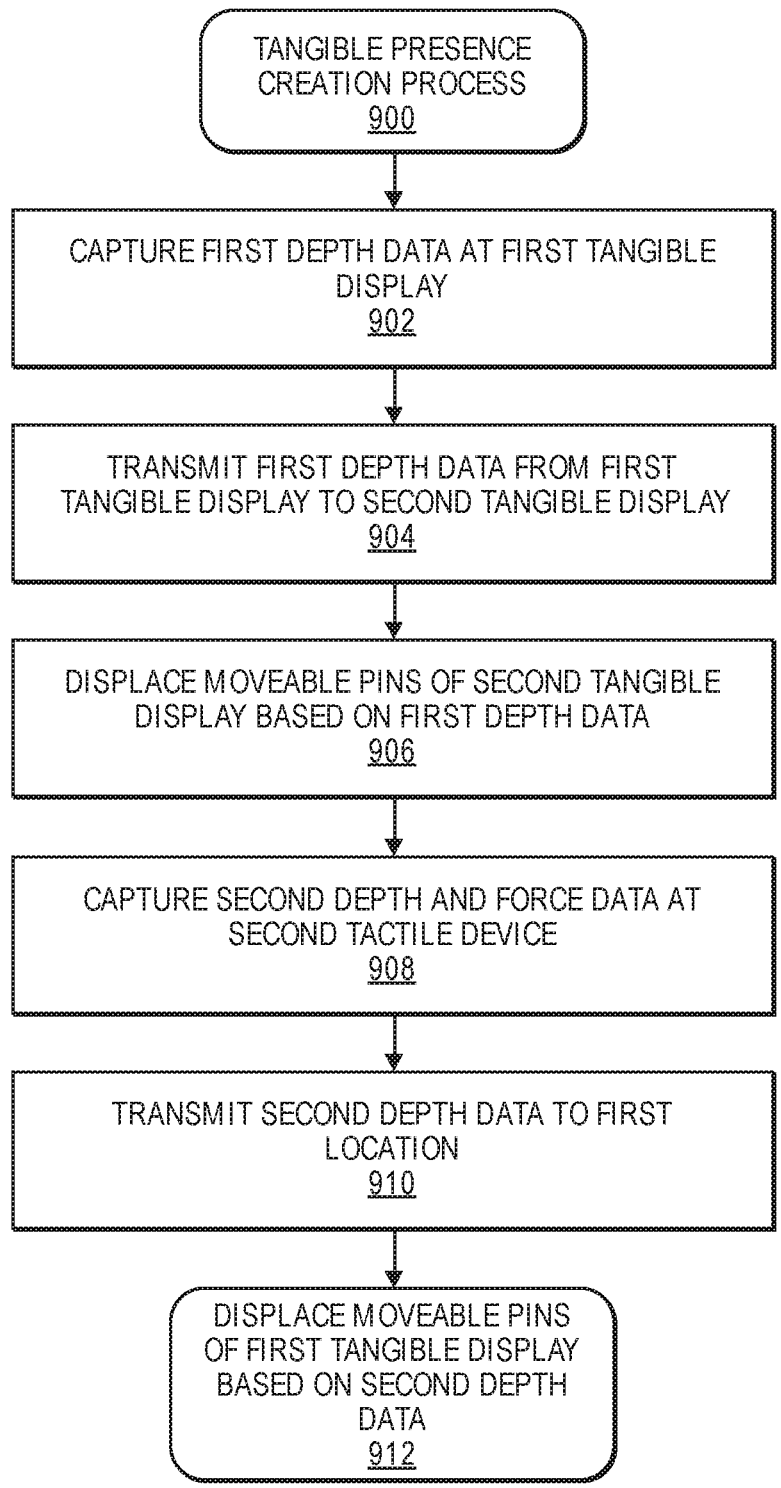
FIG. 9 is a flow diagram of another example tangible presence creation process, according to an implementation.

In some implementations, the tangible display and exchange of depth data may be used to generate three-dimensional representations of users or other objects, without a concurrent display or visual presentation of those users/other objects. For example, FIG. 9 is a flow diagram of another example tangible presence creation process 900, according to an implementation. While FIG. 9 is described with respect to generating a three-dimensional representation of a user or other object that also conveys force, in other implementations, force data may not be conveyed, and image data may or may not be conveyed and/or presented.

The example process 900 begins by capturing first depth data and first force data at a first tangible display, as at 902. For example, a first object, such as a user's hand may be pressed into or against moveable pins of the first tangible display, causing the moveable pins that contact the object to be displaced by a displacement amount and by a force at which the object contacts or presses against the moveable pins. As the moveable pins are displaced, the displacement amount of each moveable pin and corresponding force used to displace the moveable pin is determined and stored as first depth data.

As the first depth data is generated, the first depth data is transmitted from the first tangible display to a second tangible display, as at 904. In some implementations, the first tangible display may be at a first location and the second tangible display may be at a second location that is different and remote from the first location. In other implementations, the first tangible display and the second tangible display may be physically different devices but may be located in the same room, building, etc. Transmission between the first tangible display and the second tangible display may be via a wired or wireless connection and may utilize any communication channel, such as the Internet.

At the second tangible display, the received first depth data is used to displace a sub-plurality of moveable pins of the second tangible display by a displacement amount and with a force, the second displacement amount and second force determined based at least in part on the first depth data, as at 906. In some implementations, the first depth data from the first tangible display may correlate directly to the second tangible display and may be used directly to displace the moveable pins of the second tangible display in the amount and with the force indicated in the first depth data. For example, if both the first tangible display and the second tangible display have the same or similar configuration, the depth data generated at one tangible display may be directly used at the other tangible display. However, if the tangible displays have different configurations (e.g., the length, number, and/or arrangement of moveable pins vary between tangible displays), the receiving tangible display may process the received depth data to determine a corresponding depth and force that is used to displace moveable pins of that tangible display.

In some implementations, to provide bi-directional tactile feel between two tangible displays, in addition to displacing moveable pins at the second tangible display, a second force from a second object, such as a second user's hand, acting on the displaced moveable pins may be measured at the second tangible display, as at 908. Likewise, if the force applied by the second object to the moveable pins of the second tangible display displace one or more moveable pins of the second tangible display, a second displacement amount may be captured for those displaced moveable pins of the second tangible display. The second force and second displacement amounts measured at the second tangible display forms second depth data.

As the first depth data is received and used to displace moveable pins of the second tangible display, the second depth data is transmitted from the second tangible display to the first tangible display, as at 910. As the first tangible display receives the second depth data, the first tangible display utilizes the force data and any displacement amount to provide a counteracting force and/or movement of the first moveable pins against the first object, as at 912.

With the bi-directional communication between the first tangible display and the second tangible display, users of the two different tangible displays can feel the pressure or force applied by the other user at the other tangible display. Conveying force and three-dimensional shapes between two tangible displays presents another component of presence, even if the two users are at locations that are physically remote from one another.

Referring again to FIG. 2, the schematic block diagram may be illustrative of one or more aspects of the example system architecture 200 that may be used to implement the various systems and processes discussed above. In the illustrated implementation, the example system architecture 200 includes one or more processors 260, one or more remote processors 261, one or more memories 221 including various data items 222, 226, one or more processing algorithms or models including image recognition algorithms 230, speech recognition algorithms 240, and machine learning models 250, and various sensors, data, and output devices, as described herein.

The example system architecture 200 may be included as part of a computing device or system, a networked computing device or system, other input/output devices or systems, and/or other computing systems, or combinations thereof. In various implementations, the example system architecture 200 may be a uniprocessor system including one processor 160, or a multiprocessor system including several processors 260 (e.g., two, four, eight, or another suitable number). The processor(s) 260 may be any suitable processor capable of executing the processes, methods, operations, and functionality described herein, including but not limited to GPUs, CPUs, or combinations thereof. For example, in various implementations, the processor(s) 260 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 260 may commonly, but not necessarily, implement the same ISA.

The one or more memories 221 may be configured to store user data 222 and/or other data items accessible by the processor(s) 260. In various implementations, the memories 221 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the memories 221 as program instructions, data, and other information or data items. In other implementations, program instructions, data, and/or other information or data may be received, sent or stored upon different types of computer-accessible media, such as non-transitory, computer readable storage media, or on similar media separate from the memories 221 or the example system architecture 200.

Generally speaking, a non-transitory, computer readable storage medium may include storage media or memory media such as magnetic or optical media, e.g., disk or CD/DVD-ROM, coupled to the example system architecture 200 via an I/O interface. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via a network interface.

In one implementation, an I/O interface may be configured to coordinate I/O traffic between the processor(s) 260, the memories 221, any peripheral devices, such as various sensors and/or input/output devices, and a network interface or other peripheral interfaces. In some implementations, the I/O interface may perform any necessary protocol, timing or other data transformations to convert data signals from one component (e.g., memories 221) into a format suitable for use by another component (e.g., processor(s) 260). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the memories 221, may be incorporated directly into the processor(s) 260.

A network interface may be configured to allow data to be exchanged between the example system architecture 200, other devices attached to a network, such as other computer devices or systems, other input/output elements, and/or other computing resources such as remote processors 261. For example, the network interface may enable wireless communication between the example system architecture 200 and one or more other system architectures associated with other locations or other computing devices or systems of other locations. In various implementations, the network interface may support communication via wireless general data networks, such as a Wi-Fi network. For example, the network interface may support communication via telecommunications networks such as cellular communication networks, satellite networks, the Internet, and the like.

Various sensors and/or input/output devices, as described herein, may, in some implementations, include one or more visual input/output devices, audio input/output devices, pressure or contact sensors, temperature sensors, pulse detection sensors, breath analysis sensors, environment sensors, RFID or NFC sensors, actuators associated with portions or devices of locations, temperature or environment control devices, user devices, other input/output devices such as touchscreens, keyboards, mice, or other controllers, or other sensors, actuators, or input/output devices. Multiple sensors, actuators, and/or input/output devices may be present and controlled by the example system architecture 200.

As shown in FIG. 2, the memory may include program instructions which may be configured to implement the example processes, methods, operations, and functionality described above. The data storage and other information and data may include various data stores for maintaining data items that may be provided for receiving, storing, and/or processing user data, activity data, depth data, and any other functions, operations, or processes described herein.

In various implementations, the information or data described herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the example system architecture 200 is merely illustrative and is not intended to limit the scope of the present disclosure. In particular, the example system architecture may include any combination of hardware or software that can perform the indicated functions, including computers, network devices, internet appliances, PDAs, wireless phones, pagers, etc. The example system architecture 200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the example system architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the example system architecture 200 may be transmitted to the example system architecture 200 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other example system architecture configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a first location, including:
      a depth sensor operable to determine depth data for an object within a field of view of the depth sensor; and
      a first communication component operable to transmit the depth data from the first location; and
   a second location that is physically remote from the first location, including:
      a second communication component operable to receive the depth data transmitted from the first location;
      a tangible display, including:
         a plate having a thickness and a plurality of apertures;
         a plurality of moveable pins, each moveable pin of the plurality of moveable pins:
            having a length that is greater than the thickness; and
            positioned in an aperture of the plurality of apertures such that the moveable pin may be displaced with respect to the plate;
         a displacement component that includes an actuation device, the displacement component configured to at least:
            receive the depth data from the second communication component;
            determine, based at least in part on the depth data:
               a sub-plurality of moveable pins of the plurality of moveable pins that are to be displaced; and
               for each moveable pin of the sub-plurality of moveable pins, a respective displacement amount; and
            displace, with the actuation device, each of the sub-plurality of moveable pins by the respective displacement amount to create a three-dimensional representation of the object.

2. The system of claim 1, further comprising:
   a second tangible display at the first location, including:
      a second plate having a second thickness and a second plurality of apertures;
      a second plurality of moveable pins, each moveable pin of the second plurality of moveable pins:
         having a second length that is greater than the second thickness; and
         positioned in an aperture of the second plurality of apertures such that the moveable pin may be displaced with respect to the second plate;
      a second displacement sensor configured to at least:
         measure a second displacement amount of each moveable pin of the second plurality of moveable pins when the second plurality of moveable pins are displaced by a second object; and
         generate second depth data that indicates for each moveable pin of the second plurality of moveable pins, the second displacement amount.

3. The system of claim 2, further comprising:
   a third tangible display at the second location, including:
      a third plate having a third thickness and a third plurality of apertures;
      a third plurality of moveable pins, each moveable pin of the third plurality of moveable pins:
         having a third length that is greater than the third thickness; and
         positioned in an aperture of the third plurality of apertures such that the moveable pin may be displaced with respect to the third plate;
      a second displacement component including a second actuation device, the second displacement component configured to at least:
         receive the second depth data;
         determine, based at least in part on the second depth data:
            a second sub-plurality of moveable pins of the third plurality of moveable pins that are to be displaced; and
            for each moveable pin of the third sub-plurality of moveable pins, a third displacement amount; and displace, with the second actuation device, each of the third sub-plurality of moveable pins by the third displacement amount to create a second three-dimensional representation of the object.

4. The system of claim 2, wherein the displacement sensor is further configured to at least:
   measure an amount of force applied to each moveable pin as the moveable pin is displaced by the second object; and
   wherein the second depth data further indicates for each moveable pin of the second plurality of moveable pins, a force amount.

5. A tangible display apparatus, comprising:
   a plate having a thickness and a plurality of apertures;
   a plurality of moveable pins, each moveable pin:
      having a length that is greater than the thickness; and
      positioned in an aperture of the plurality of apertures such that the moveable pin is displaceable with respect to the plate;
   a communication component operable to receive a depth data corresponding to a three-dimensional object;
   a displacement component coupled to the communication component and including an actuation device that is coupled to each of the plurality of moveable pins, the displacement component configured to at least:
      receive, from the communication component, the depth data corresponding to the three-dimensional object;
      determine a sub-plurality of moveable pins of the plurality of moveable pins to be displaced to form a three-dimensional representation of the three-dimensional object; and
      displace, with the actuation device and based at least in part on the depth data, each moveable pin of the sub-plurality of moveable pins by a displacement amount such that the sub-plurality of moveable pins, when displaced, form the three-dimensional representation of the three-dimensional object.

6. The tangible display apparatus of claim 5, wherein the displacement component is further configured to at least:
   displace, with the actuation device, each moveable pin of the at least a sub-plurality of moveable pins with a respective amount of force indicated in the depth data.

7. The tangible display apparatus of claim 5, further comprising:
   a displacement sensor configured to at least:
      measure a second displacement amount of each moveable pin of the plurality of moveable pins when the plurality of moveable pins are displaced by a second object coming into contact with the plurality of moveable pins; and
      generate second depth data that indicates for each moveable pin of the plurality of moveable pins, the second displacement amount.

8. The tangible display apparatus of claim 7, wherein the displacement sensor is further configured to at least:
   measure an amount of force applied to each moveable pin of the plurality of moveable pins by the second object; and
   include the amount of force for each moveable pin in the second depth data.

9. The tangible display apparatus of claim 5, wherein the displacement component is further configured to at least:
   determine, for each moveable pin of at least the sub-plurality of moveable pins, a pin address that allows the displacement component to individually address the moveable pin.

10. The tangible display apparatus of claim 5, further comprising:
    a display component configured to present a visual representation of the three-dimensional object concurrent with the displacement of the sub-plurality of moveable pins.

11. The tangible display apparatus of claim 10, wherein the visual representation is projected from a camera onto a surface formed by the sub-plurality of moveable pins when displaced.

12. The tangible display apparatus of claim 10, wherein:
    each moveable pin of the plurality of moveable pins includes a visible light presentation component with which visible light may be output; and
    the visual representation is produced by outputting visible light with visible light presentation components of at least the sub-plurality of moveable pins while displaced.

13. The tangible display apparatus of claim 5, further comprising:
    a flexible membrane positioned adjacent the plurality of moveable pins such that moveable pins of the plurality of moveable pins, when displaced, contact the flexible membrane.

14. The tangible display apparatus of claim 13, further comprising:
    a display component configured to present a visual representation of the three-dimensional object onto the flexible membrane.

15. The tangible display apparatus of claim 5, wherein the actuation device is at least one of electromechanically coupled to each of the plurality of moveable pins, hydraulically coupled to each of the plurality of moveable pins, pneumatically coupled to each of the plurality of moveable pins, mechanically coupled to each of the plurality of moveable pins, or magnetically coupled to each of the plurality of moveable pins.

16. A system, comprising:
    a first location, including:
       a depth sensor operable to determine depth data for an object at the first location; and
       a first communication component operable to transmit the depth data from the first location; and
    a second location that is physically remote from the first location, including:
       a second communication component operable to receive the depth data transmitted from the first location;
       a tangible display, including:
          a plurality of moveable pins, each moveable pin:
             having a length; and
             positioned at a row and column position of the tangible display such that the moveable pin is individually addressable;
          a displacement component configured to at least:
             receive the depth data from the second communication component;
             determine, based at least in part on the depth data:
                a sub-plurality of moveable pins of the plurality of moveable pins that are to be displaced;
                for each moveable pin of the sub-plurality of moveable pins, a displacement amount; and
                address each moveable pin of the sub-plurality of moveable pins and cause the moveable pin to be displaced by the displacement amount such that the sub-plurality of moveable pins, when displaced, produce a three-dimensional representation of at least a portion of the object.

17. The system of claim 16, further comprising:
an output device positioned at the second location and configured to present a visual representation of the at least a portion of the object concurrently with the three-dimensional representation of the at least a portion of the object.

18. The system of claim 17, wherein the output device includes at least one of:
- a projector configured to project the visual representation onto a surface formed by the sub-plurality of moveable pins when displaced; or
- a plurality of visible light presentation components included in the tangible display and operable to output visible light to form the visual representation.

19. The system of claim 16, further comprising:
a visible light presentation component included in a moveable pin of the plurality of moveable pins and operable to output a visible light at a head of the moveable pin.

20. The system of claim 19, wherein the visible light presentation component includes at least one of a display mounted to the head of the pin, fiber optic cable, a lucite rod, a light emitting diode, an organic light emitting diode, or a laser.

* * * * *